United States Patent

Kondo et al.

Patent Number: 5,528,606
Date of Patent: Jun. 18, 1996

[54] ERROR CORRECTING APPARATUS

[75] Inventors: Tetsujiro Kondo, Kanagawa; Kenji Takahashi, Tokyo, both of Japan

[73] Assignee: Sony Corporation, Tokyo, Japan

[21] Appl. No.: 133,833

[22] Filed: Oct. 12, 1993

[30] Foreign Application Priority Data

Oct. 13, 1992 [JP] Japan .................. 4-274561

[51] Int. Cl.⁶ ...................................... G06F 11/10
[52] U.S. Cl. ........................... 371/37.4; 371/37.1
[58] Field of Search ............... 371/37.1, 37.4, 371/43, 37.5; 348/405, 420, 409, 417

[56] References Cited

U.S. PATENT DOCUMENTS

| | | | |
|---|---|---|---|
| 4,189,748 | 2/1980 | Reis | 358/133 |
| 4,211,996 | 7/1980 | Nakamura | 371/37.1 |
| 4,703,352 | 10/1987 | Kondo | 358/135 |
| 5,212,603 | 5/1993 | Hasegawa | 360/77.01 |
| 5,218,622 | 6/1993 | Fazel et al. | 375/122 |
| 5,253,242 | 10/1993 | Satoh et al. | 369/47 |
| 5,335,116 | 8/1994 | Onishi et al. | 360/9.1 |

FOREIGN PATENT DOCUMENTS

| | | |
|---|---|---|
| 0083127 | 7/1983 | European Pat. Off. . |
| 0436251 | 7/1991 | France . |

OTHER PUBLICATIONS

IEEE Transactions on Consumer Electronics, vol. CE-32, No. 3, Aug. 1986, New York US pp. 362-371 Driessen et al. 'An Experimental Digital Video Recording System'p. 367, right column, last paragraph p. 369, right column, par. 1.
Patent Abstracts of Japan vol. 12, No. 153 (E-607) 11 May 1988, JP-A-62 266 989 (Sony Corporation) 19 Nov. 1987 *abstract*.

Primary Examiner—Paul P. Gordon
Attorney, Agent, or Firm—William S. Frommer; Alvin Sinderbrand

[57] ABSTRACT

A coding apparatus for coding digital data is comprised of an encode circuit for encoding digital data, and an error correction code adding circuit for adding error correction codes of different bit numbers to respective encoded digital data. Also, a transmitting apparatus is comprised of an encode circuit for encoding digital data, an error correction code adding circuit for adding error correction codes of different bit numbers to the respective encoded digital data, a circuit for transmitting encoded data with the error correction code added, a circuit for receiving the transmitted data, a circuit for error-correcting the received data by using an error correction code contained in the received data, and a circuit for decoding the error-corrected data. Further, a coding method for coding digital data is comprised of the steps of encoding digital data, and adding error correction codes of different bit numbers to the respective encoded digital data.

11 Claims, 7 Drawing Sheets

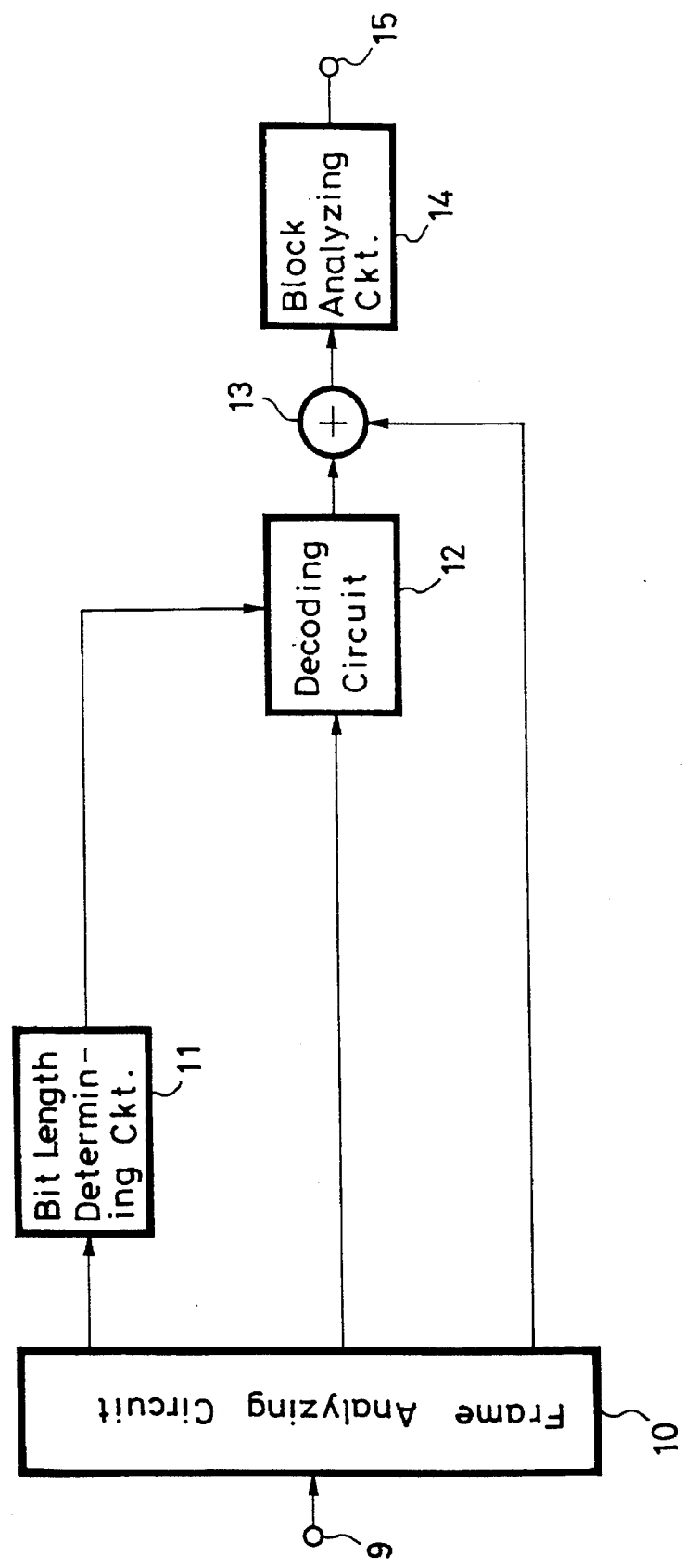

ERROR CORRECTING APPARATUS

BACKGROUND OF THE INVENTION

1. Field of the Invention

The present invention relates to an error correction code adding apparatus and an error correcting apparatus for use with an equipment having a CODEC (coder/decoder) for compressing information by coding or obtaining original information by decoding the compressed information.

2. Description of the Prior Art

There has heretofore been proposed an apparatus called CODEC that compresses video data by the encode processing when video data is transmitted or recorded. The encoding of video data is standardized by video CODEC (coder/decoder) recommendation H.261 established on December, 1990 by Comité Consultatif International des Télégraphique et Téléphonique (CCIT) under International Telecommunication Union (ITU).

The application of the moving image coding is in broadcasting, communication or the like by using a standard television receiver, a high-definition television receiver as a signal source and in the field of data storage as a local signal processing.

As a video format based on the recommendation H.261, there is known a CIF (common intermediate format) which can solve the problems of different television systems in the area (whole world) and which can make a communication between the CODECs. A resolution of a picture based on the CIF is 352 dots (horizontal direction) ×288 dots (vertical direction).

Generally, in a coding unit of the video CODEC, input video data is encoded by an encoder, multiplexed and this data is temporarily stored in a transmission buffer. Thereafter, this data is encoded by a transmission encoder and transmitted as encoded bit string. In the decoding unit, video data of the coded bit string is decoded by a transmission decoder. After this data is temporarily stored in a reception buffer, this data is multiplexed and this data is decoded to provide an original video signal.

When video data of vehemently large amount is transmitted, such video data is compressed by the coding upon transmission. Then, upon reception, the video data that is compressed by the coding is decoded.

Therefore, the video CODEC is not limited to the video transmission and can be used when video data is recorded by a VTR, for example.

In particular, video data of the high definition television system that makes a remarkable development recently is different from video data of the standard television system and an amount thereof becomes enormous. Therefore, a technique in which video data is encoded and compressed upon recording and original video data is obtained by the decoding upon reproduction is an indispensable problem in order to reduce a recording cost considerably.

As one of methods for coding a television signal by this CODEC, there are known several methods of reducing an average bit number per pixel or reducing a sampling frequency in order to narrow a transmission band.

As a coding method for decreasing a sampling frequency, there are proposed a method of decimating video data to the half by sub-sampling and a method of transmitting a flag indicative of data at a sub-sampling point and a position of sub-sampling point used in the interpolation, i.e., sub-sampling points of upper and lower or left and right sampling points.

As one of the methods of reducing the average bit number per pixel, there is known a DPCM (differential pulse code modulation). Because a correlation of pixels in a television signal is high and a difference between pixels close to each other is small, the DPCM is adapted to quantize and transmit a difference signal.

As other coding method of reducing the average bit number per pixel, there is known such a method that a picture of one field is divided into very small blocks and an average value, a standard deviation and an encoded code of one bit per pixel are transmitted at every block.

According to the encoding method that reduces a sampling frequency by using the sub-sampling, the sampling frequency is reduced to the half. There is then the risk that an aliasing noise occurs. The DPCM cannot solve the problem that an error propagates to the succeeding decoding. Further, according to the method of coding digital data at the unit of blocks, there is then the drawback that a block distortion occurs at the boundary between adjacent blocks.

Therefore, the assignee of the present invention has previously proposed a high-efficiency coding apparatus in which a dynamic range determined by a maximum value and a minimum value of a plurality of pixels contained in a two-dimensional block is obtained and digital data is coded by a variable bit length adaptive to this dynamic range (see U.S. Pat. No. 4,703,352, issued Oct. 27, 1987 to Kondo).

FIG. 1 of the accompanying drawings is used to explain a previously-proposed technology of a variable bit length coding adaptive to the dynamic range, i.e., adaptive dynamic range coding (ADRC). In this case, the dynamic range is calculated at every two-dimensional block (4 lines ×4 pixels=16 pixels).

The minimum level (minimum value) within the block is eliminated from input video data in which one sample is formed of 8 bits). The video data from which the minimum value is eliminated is quantized. This quantization is the process for converting the video data from which the minimum value is eliminated into a representative level. A permissible maximum value (referred to as a maximum distortion) of a quantization distortion occurred when this quantization is effected is set to a predetermined value, for example, 4.

FIG. 1A shows the case that the dynamic range (difference between a maximum value MAX and a minimum value MIN) is 8 (DR=8). In the case of DR=8, the center level 4 is set to the representative level L0 and therefore a maximum distortion E=4.

When $0 \leq DR \leq 8$ is satisfied, the central level of the dynamic range is set to the representative level and quantized data need not be transmitted. Therefore, a required bit length Nb is 0. On the receiving side, the decoding is carried out in which the representative level L0 is set to be a decoded value from the minimum value MIN of the block and the dynamic range.

FIG. 1B shows the case of DR=17 in which representative levels L0=4 and L1=13 are determined respectively and the maximum distortion E becomes 4. There are two representative levels L0 and L1, Nb=1 is established. In the case of $9 \leq DR \leq 17$, Nb=1 is established. The maximum distortion E becomes smaller as the dynamic range becomes narrower.

FIG. 1C shows the case of DR=35, wherein representative levels L0=4, L1=13, L2=22 and L3=31 are determined respectively, and E=4 is established. There are four representative levels L0 to L3, and Nb=2 is established. In the case of 18≦DR≦35, Nb=2 is established.

In the case of 36≦DR≦71, there are used eight representative levels L0 to L7. FIG. 1D shows the case of DR =71, in which representative levels are respectively determined as L0=4, L1=13, L2=22, L3=31, L4=40, L5=49, L6=58 and L7=67. In this case, Nb=3 is established in order to distinguish the eight representative levels L0 to L7.

In the case of 72≦DR≦143, there are used 16 representative levels L0 to L15. FIG. 1E shows the case of DR =143, in which representative levels are respectively determined as L8=76, L9=85, L10=94, L11=103, L12=12, L13=121, L14= 130 and L15=139 (L0 to L7 are similar to earlier-noted values). In this case, Nb=5 is established in order to distinguish 32 representative levels L0 to L31. In actual practice, because input pixel data is quantized by 8 bits, the maximum value of the dynamic range is 255 and cannot be quantized into representative levels L28 to L31.

Since the television signal within one block has a correlation concerning the two-dimensional direction of the horizontal and vertical directions and a three-dimensional correlation concerning the time direction, the level of image data contained in the same block is changed with a small width in the stationary portion. Therefore, even when a dynamic range of data DT1 from which the minimum level MIN commonly shared by the pixel data within the block is removed is quantized by a quantization bit number less than the original quantization bit number, there hardly occurs a quantization distortion. By reducing the quantization bit number, a data transmission band width can be narrowed as compared with the original one.

In the above-mentioned high-efficiency coding apparatus, an error correction code and a synchronizing (sync.) code are uniformly added to the data on which various processings are effected in order to compress the data, i.e., MSB data, second MSB data, . . . , LSB data. Thereafter, such data is recorded on a recording medium through a recording system or transmitted through a transmission system.

When original data is decoded from recorded data or transmitted data, the framed data is analyzed into added data and coded data, whereafter each data is error-corrected. Thereafter, original data is decoded by interpolating data which is inverse coding or processed in a sub-sampling.

If the same error correction code is added to the data that is encoded by the ADRC or the like, i.e., such data is error-corrected uniformly, then when an error remains in the LSB data, the picture quality is not deteriorated so much. When, however, an error remains in the MSB data, there is then the disadvantage that a decoded image is greatly deteriorated in picture quality from a visual sense standpoint.

Furthermore, when the bits of the error correction code is increased, or a powerful error correction is carried out in order to reduce such deterioration of picture quality, there is then the disadvantage that transmission information is increased.

OBJECTS AND SUMMARY OF THE INVENTION

Therefore, it is an object of the present invention to provide an improved error correction code adding apparatus and an error correction apparatus in which the aforesaid shortcomings and disadvantages of the prior art can be eliminated.

More specifically, it is an object of the present invention to provide an error correction code adding apparatus and an error correction apparatus in which transmission information can be made minimum.

Another object of the present invention is to provide an error correction code adding apparatus and an error correction apparatus in which a picture quality of a decoded image can be improved considerably.

According to a first aspect of the present invention, there is provided a coding apparatus for coding digital data which comprises an encode circuit for encoding digital data, and an error correction code adding circuit for adding error correction codes of different bit numbers to respective encoded digital data.

According to a second aspect of the present invention, there is provided a transmitting apparatus which comprises an encode circuit for encoding digital data, an error correction code adding circuit for adding error correction codes of different bit numbers to the respective encoded digital data, a circuit for transmitting encoded data with the error correction code added, a circuit for receiving the transmitted data, a circuit for error-correcting the received data by using an error correction code contained in the received data, and a circuit for decoding the error-corrected data.

According to a third aspect of the present invention, there is provided a coding method for coding digital data which comprises the steps of encoding digital data, and adding error correction codes of different bit numbers to the respective encoded digital data.

According to an error correction code adding apparatus of the present invention, error correction codes having different bit numbers are respectively added to coded image information.

According to the present invention, error correction codes having different bit numbers are respectively added to MSB side information and LSB side information of the above-mentioned coded information.

According to the present invention, the bit number of the error correction code added to the MSB side information is larger than that of the error correction code added to the LSB side information.

According to the present invention, when the error correction code is added to the above-mentioned coded image information, error correction codes whose bit numbers are sequentially reduced are added to the information from the MSB side information to the LSB side information.

According to the present invention, the error correction code is added to only information corresponding to the MSB of the above-mentioned coded information.

According to the present invention, different error correction codes are added to the above-mentioned coded information depending on frequencies.

Further, according to the present invention, when the error correction code is added to the above-mentioned coded information, an error correction code having a large bit number is added to information having a low frequency.

Further, according to the error correction apparatus of the present invention, the error correction processing is carried out by using error correction codes having different bit numbers added to a coded image information.

Further, according to the error correction apparatus of the present invention, error correction codes have different bit numbers depending on error correction coded added to MSB side information and error correction codes added to LSB side information.

Furthermore, according to the error correction apparatus of the present invention, the bit number of the error correction code added to the MSB side information is larger than that of the error correction code added to the LSB side information.

Furthermore, according to the error correction apparatus of the present invention, when the error correction code is added to the above-mentioned coded image information, error correction codes whose bit numbers are sequentially reduced are added to the information from the MSB side information to the LSB side information.

Furthermore, according to the error correction apparatus of the present invention, the error correction code is added to only information corresponding to the MSB of the above-mentioned coded information.

Furthermore, according to the error correction apparatus of the present invention, error correction codes are made different in response to frequencies of image information.

Furthermore, according to the error correction apparatus of the present invention, the bit number of the error correction code is increased as the frequency of image information to which the error correction code is added is low.

The above and other objects, features, and advantages of the present invention will become apparent from the following detailed description of an illustrative embodiment thereof to be read in conjunction with the accompanying drawings.

BRIEF DESCRIPTION OF THE DRAWINGS

FIG. 6 is a block diagram showing a circuit arrangement of an error correction apparatus according to an embodiment of the present invention.

DETAILED DESCRIPTION OF THE PREFERRED EMBODIMENT

An embodiment of an error correction code adding apparatus and an error correction apparatus according to the present invention will hereinafter be described with reference to the drawings.

Figure 1A:
FIGS. 1A, 1B, 1C, 1D, 1E, and 1F are diagrams used to explain an ADRC processing, respectively.
Figure 1B:
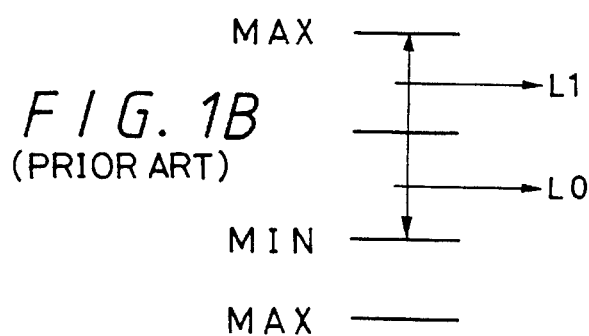
Figure 1C:
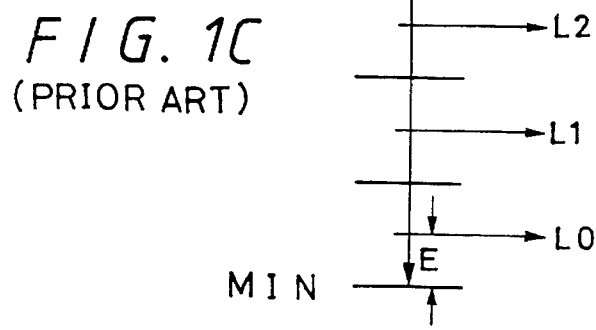
Figure 1D:
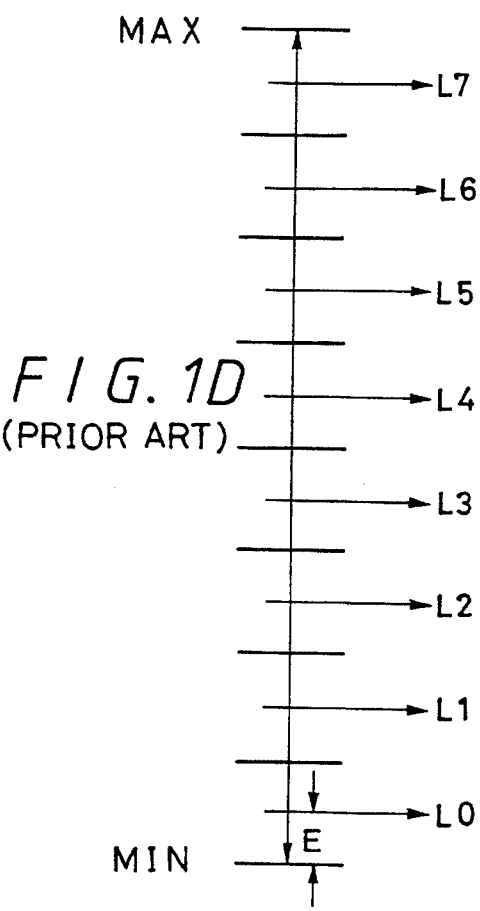
Figure 1E:
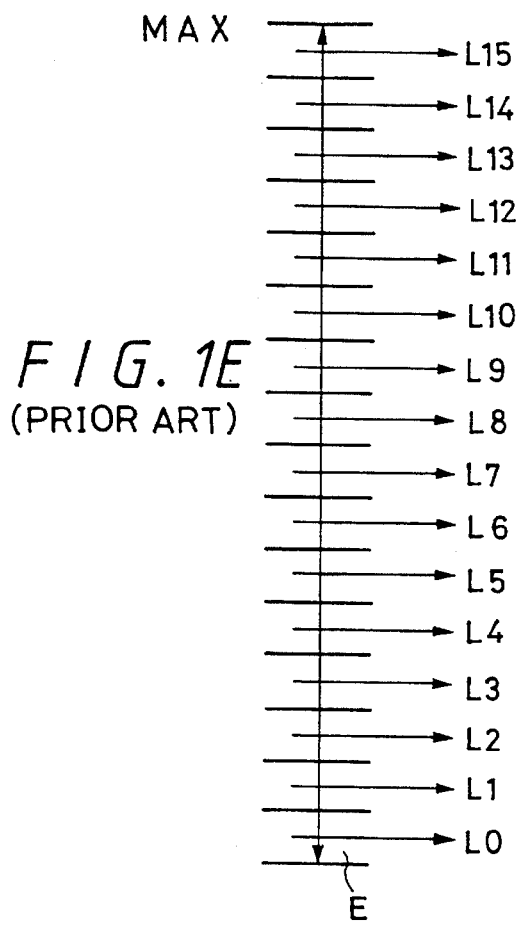
Figure 1F:
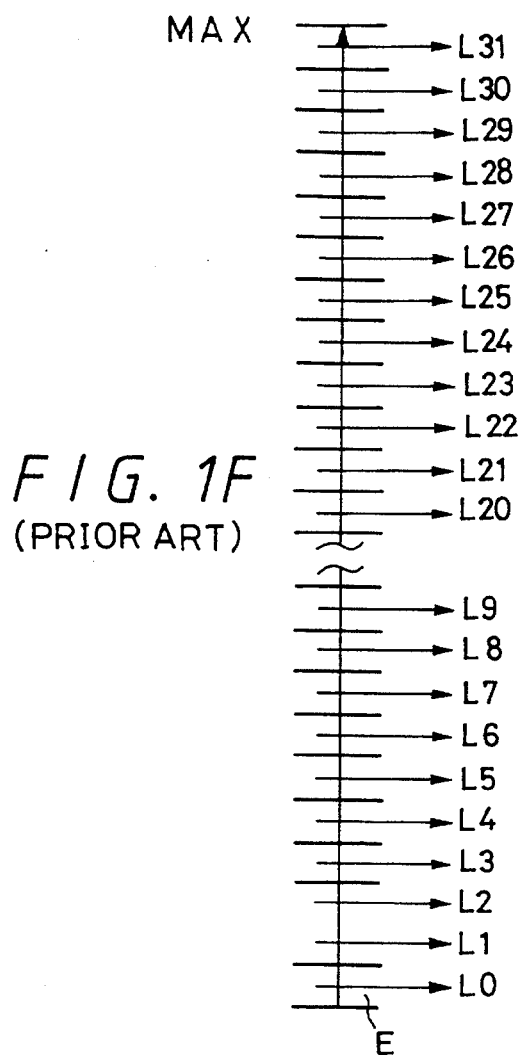
Figure 2:
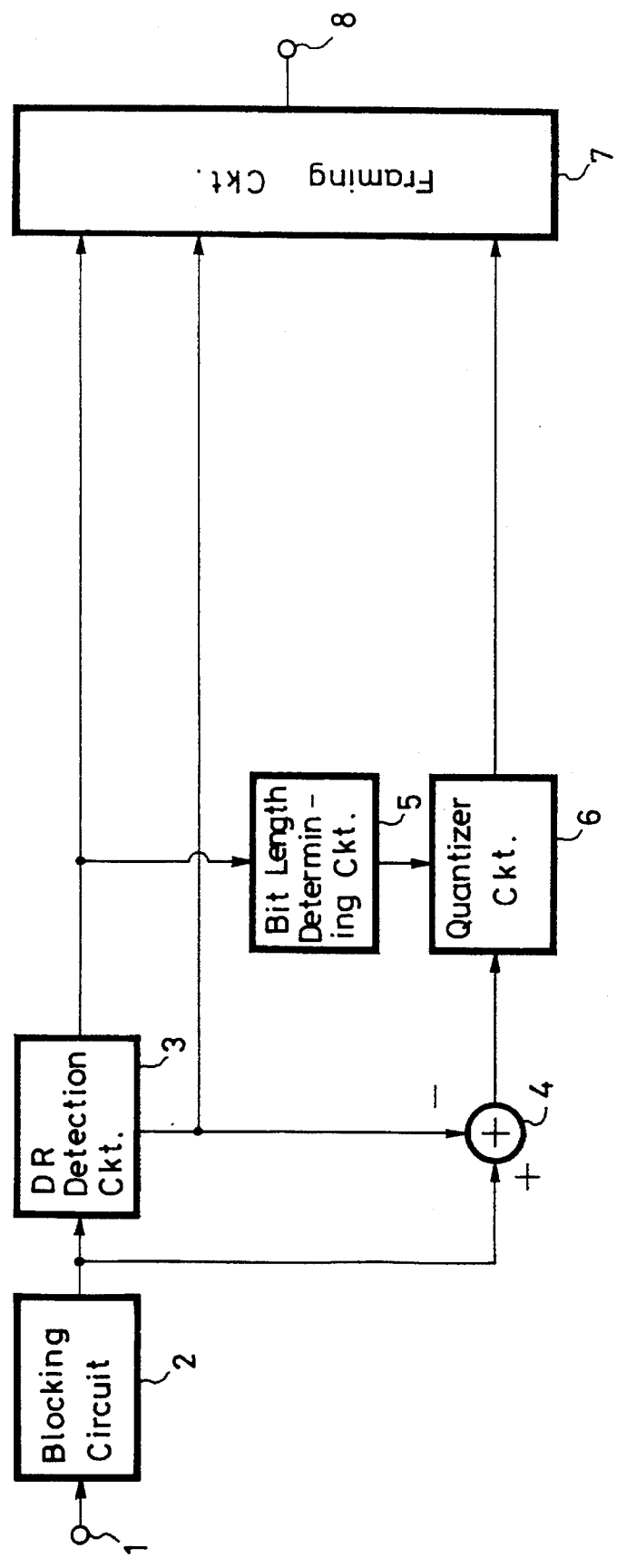
FIG. 2 is a block diagram showing a circuit arrangement of an error correction code adding apparatus according to an embodiment of the present invention.

As shown in FIG. 2, there is provided an input terminal 1 to which there is supplied image data (digital television signal) whose one sample is quantized to 8 bits from a VTR (video tape recorder) body circuit (not shown). The image data from the input terminal 1 is supplied to a blocking circuit 2.

The blocking circuit 2 converts the input image data into a signal which is a consecutive signal at every two-dimensional block which is the coding unit. A size of one block is (4 lines×4 pixels=16 pixels), for example. Image data (pixel data) thus processed by the blocking circuit 2 is supplied to a dynamic range (DR) detecting circuit 3 and an adding circuit 4.

The dynamic range detecting circuit 3 detects a dynamic range and a minimum value of the image data supplied thereto from the blocking circuit 2 at every block. Minimum data from the dynamic range detecting circuit 3 is supplied to the adding circuit 4 and a framing circuit 7. A dynamic range from the dynamic range detecting circuit 3 is supplied to a bit length determining circuit 5 and the framing circuit 7.

The adding circuit 4 subtracts the minimum data of the dynamic range detecting circuit 3 from the image data of the blocking circuit 2 and supplies its subtracted result to a quantizer circuit 6.

The bit length determining circuit 5 determines the quantization bit number (bit length) in response to the dynamic range. In this case, the bit length is determined in consideration of human visual sense characteristic. That is to say, when the dynamic range is large, a maximum distortion is increased.

By way of example, the bit length determining circuit 5 determines the bit length in response to the dynamic range as follows. When the dynamic range is greater than 0 and less than 10, the bit length is determined to be "0" and the maximum distortion is determined to be "5". When the dynamic ranges is greater than 11 and less than 25, the bit length is determined to be "1" and the maximum distortion is determined to be "6". When the dynamic range is greater than 26 and less than 99, the bit length is determined to be and the maximum distortion is determined to be "12". When the dynamic range is greater than 100 and less than 255, the bit length is determined to be "3" and the maximum distortion is determined to be "16".

The bit length thus determined is supplied to the quantizer circuit 6. The quantizer circuit 6 quantizes the added result from the adding circuit 4, i.e., image data whose minimum value was eliminated on the basis of the bit length data from the bit length determining circuit 6. Data thus quantized, i.e., coded code is supplied to the framing circuit 7 from the quantizer circuit 6.

In FIG. 2, the blocking circuit 2, the dynamic range detecting circuit 3, the adding circuit 4, the bit length determining circuit 5 and the quantizer circuit 6 constitute an ADRC (adaptive dynamic range coding) circuit.

The framing circuit 7 effect the error correction coding processing on the dynamic range data (e.g., 8 bits) and the minimum data (e.g., 8 bits) from the dynamic range detecting circuit 3 and block data (coded data) from the quantizer circuit 6 and also adds the same with a synchronizing data to thereby obtain recording data or transmission data which are delivered through an output terminal 8 to a VTR recording system (not shown) or the like.

The VTR recording system records data from the framing circuit 7 so as to form slant tracks on a magnetic tape (not shown).

Error correction code adding operation in the framing circuit 7 will be described with reference to FIG. 3.

Figure 3:
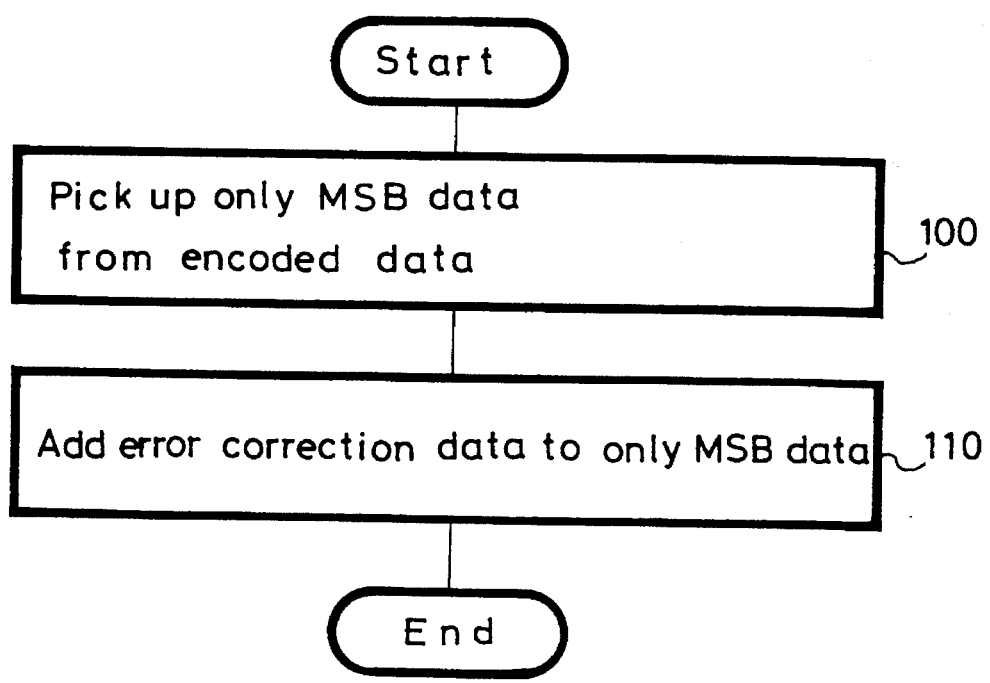
FIG. 3 is a flowchart to which references will be made in explaining the error correction code adding apparatus according to the embodiment of the present invention.

Referring to FIG. 3, following the start of operation, in step 100, only MSB data of encoded data is picked up, and the processing then proceeds to step 110. That is, there is extracted only data corresponding to MSB data of output data from the quantizer circuit 6 shown in FIG. 2. In the next step 110, an error correction code is added to only the MSB data, and then the processing is ended.

More specifically, error correction codes are respectively added to data corresponding to MSB data extracted at step 100. Then, the framing circuit 7 adds the synchronizing signal to data corresponding to MSB data added with the error correction code, data corresponding to second MSB data, ..., data corresponding to LSB data and then outputs the same through the output terminal 8 to the recording system or transmission system (not shown).

With the above-mentioned arrangement, since the error correction code is added to the data corresponding to the MSB data, a transmission information amount can be reduced and the bit number of the error correction code can be increased. Therefore, when data is decoded again as an image, a deterioration from a visual sense standpoint can be reduced considerably.

In this embodiment, error correction codes whose bit numbers are reduced sequentially are added to data corresponding to the MSB data, data corresponding to the second MSB data, ..., data corresponding to the LSB data, respectively. This error correction code adding operation will be described with reference to FIG. 4.

Figure 4:
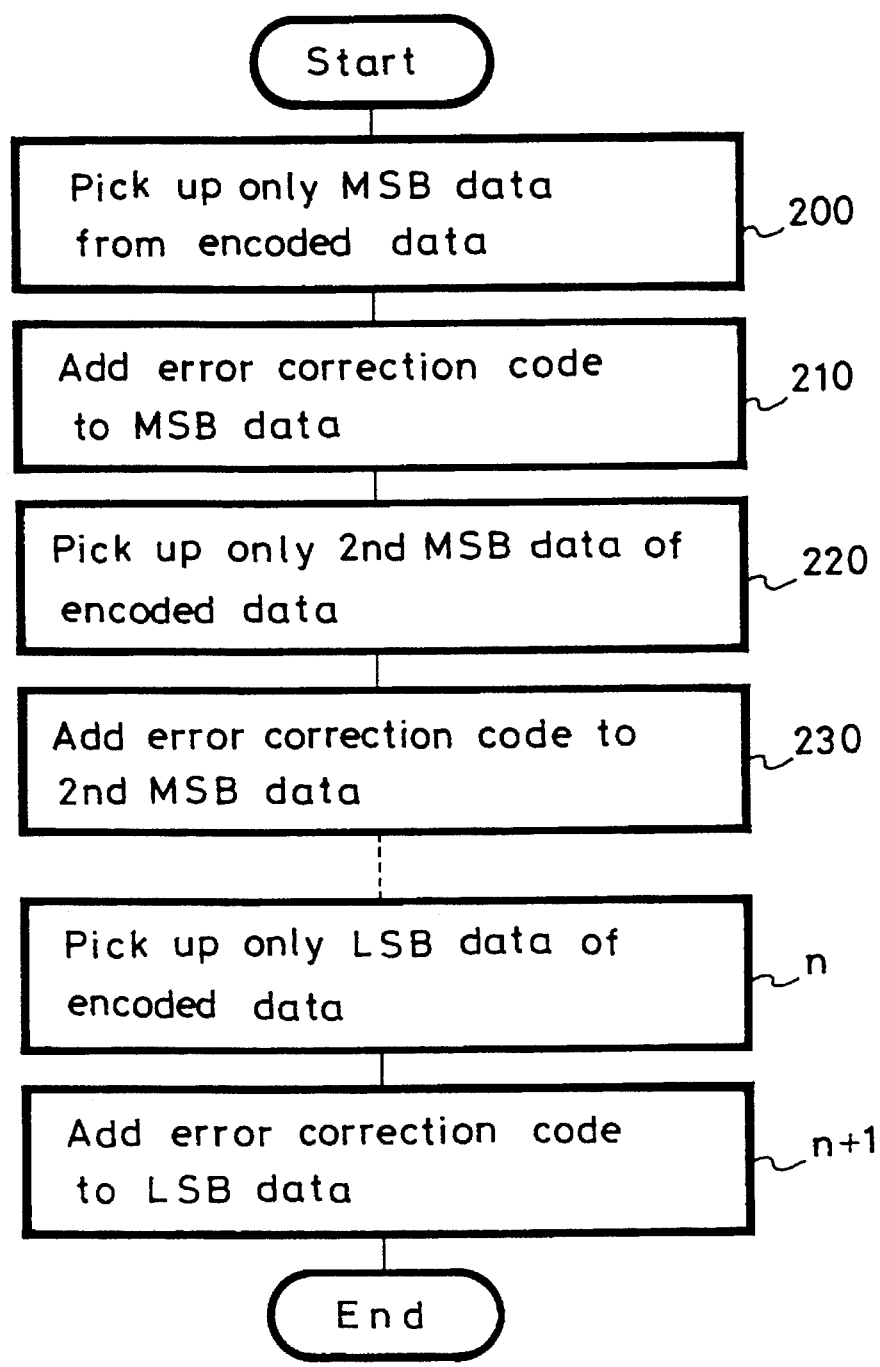
FIG. 4 is a flowchart to which references will be made in explaining the error correction code adding apparatus according to the embodiment of the present invention.

As shown in FIG. 4, following the start of operation, in step 200, only MSB data of encoded data is picked up and then the processing proceeds to step 210. That is to say, there is extracted only the data corresponding to the MSB data of data supplied from the quantizer circuit 6 shown in FIG. 2.

In step 210, the error correction code is added to the MSB data and then the processing proceeds to step 220.

The bit number of the error correction code added to the MSB data is selected to be maximum. The reason for this is that, when an error occurs in the data corresponding to the MSB data, a deterioration of picture quality that is most influential from a visual sense standpoint takes place.

In step 220, only second data of the encoded data is picked up and then the processing proceeds to step 230. That is to say, there is extracted only the data corresponding to the second MSB data of the data from the quantizer circuit 6 shown in FIG. 2.

In step 230, an error correction code is added to the second MSB data and then the processing proceeds to step 240.

The bit number of the error correction code added to the second MSB data is smaller than that of the error correction code added to the data corresponding to the MSB data. The reason for this that, when an error occurs in the data corresponding to the MSB data, a deterioration of picture quality that is more influential takes place as compared with the case that an error occurs in the data corresponding to the second MSB data.

Though not shown, error correction codes having smaller bit numbers are sequentially added to third MSB data, fourth MSB data, ... similarly.

In step n, only LSB data of encoded data is picked up. That is to say, there is extracted only data corresponding to LSB data of data from the quantizer circuit 6 shown in FIG. 2.

In step n+1, an error correction code is added to the LSB data, and then the processing is ended.

The bit number of error correction code added to the LSB data is selected to be smaller than that of error correction code added to data corresponding to the (n-1)'th MSB data that is just before the LSB data. The reason for this is that, when an error occurs in the data corresponding to the (n-1)'th MSB data, a deterioration of picture quality which is more influential takes place as compared with the case that an error occurs in the data corresponding to the LSB data.

The framing circuit 7 adds the synchronizing signal to the data corresponding to the MSB data, the data corresponding to the second MSB data, ..., data corresponding to the LSB data added with the error correction codes whose bit numbers are sequentially smaller, and then outputs the same through the output terminal 8 to the recording system and the transmission system.

With the above-mentioned arrangement, since the error correction codes whose bit numbers are sequentially reduced area added to the data from the data corresponding to the MSB data to the data corresponding to the LSB data, a transmission information amount can be reduced and the bit number of the error correction code can be increased as data becomes influential in deterioration of picture quality from a visual sense standpoint. Therefore, when data is decoded again as an image, a deterioration from a visual sense standpoint can be reduced considerably.

While all data corresponding to the MSB data are extracted and added with the error correction codes, all data corresponding to the second MSB data are extracted and added with the error correction codes, ..., all data corresponding to the LSB data are extracted and added with the error correction codes as described above, the present invention is not limited thereto and the coding may be carried out at every block data. Further, when the coding is carried out at every field or at every frame, the error correction code is added at these units.

While the coding by the ADRC processing is carried out as the block coding processing as described above, according to this embodiment, the error correction coding can be carried out efficiently even when a coding based on a discrete cosine transform (DCT) is carried out.

An example of a circuit arrangement for effecting the discrete cosine transform is not shown herein and the discrete cosine transform may be effected by a small modification. That is to say, in FIG. 2, the dynamic range detecting circuit 3, the adding circuit 4, the bit length determining circuit 5 and the quantizer circuit 6 may be replaced with a discrete cosine transform circuit and further, the error correction code adding processing in the framing circuit 7 may be modified.

Operation that is done by the framing circuit 7 when an error correction code is added to data that is processed in a discrete cosine transform fashion will be described with reference to FIG. 5.

Figure 5:
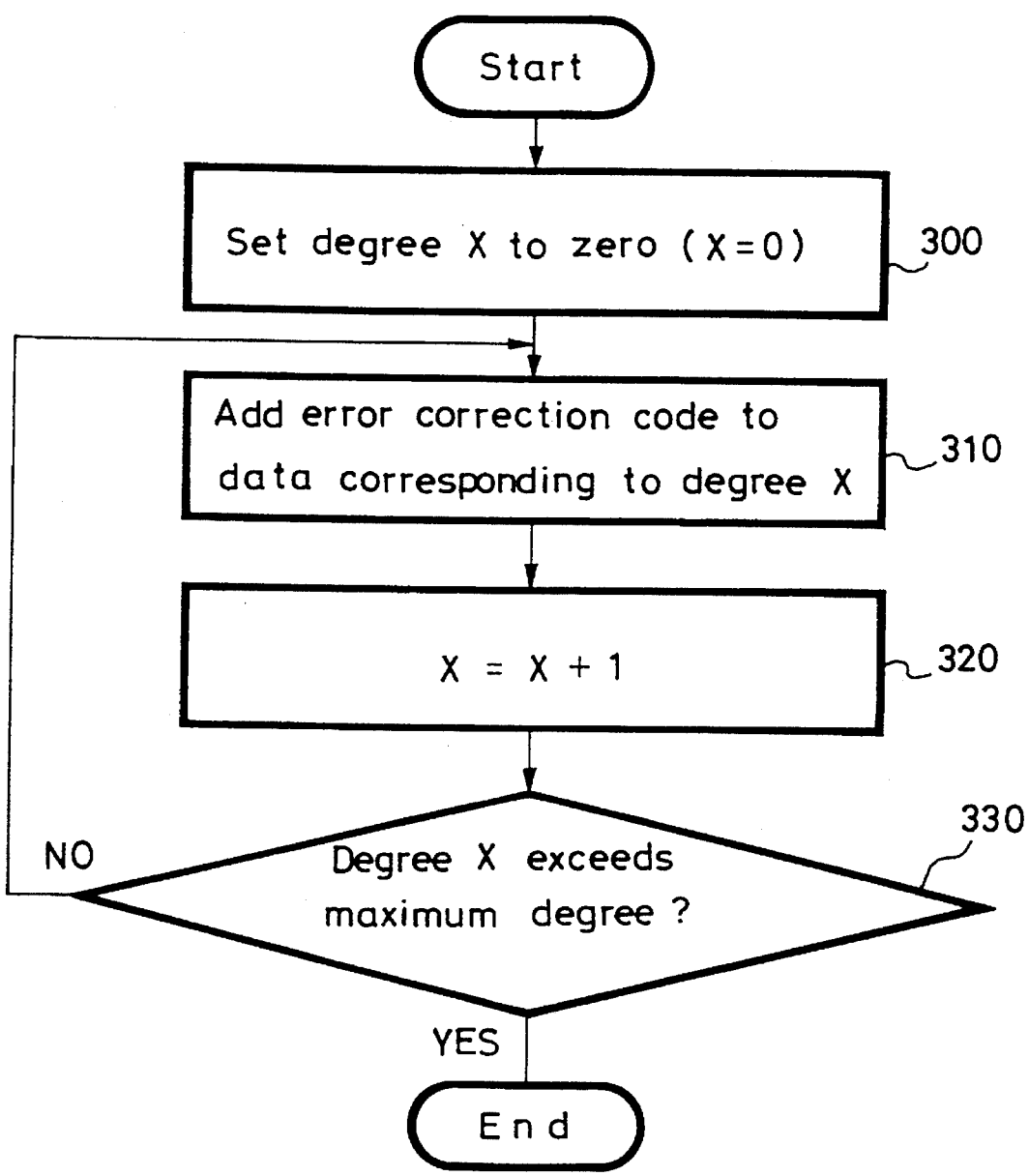
FIG. 5 is a flowchart to which references will be made in explaining the error correction code adding apparatus according to the embodiment of the present invention.

Referring to FIG. 5, following the start of operation, in step 300, a degree x of discrete cosine transform data is set to "0", and then the processing proceeds to step 310.

Then, in step 310, an error correction code is added to data corresponding to the degree x and then the processing proceeds to step 320.

In step 320, "1" is added to the degree x and then the processing proceeds to the next decision step 330. It is determined in decision step 330 whether or not the degree x is beyond the maximum degree. If a YES is output at decision step 330, then the processing is ended. If on the other hand a No is output at decision step 330, then the processing returns to step 310.

Generally, the discrete cosine transform is to convert the level of data into some suitable components such as a DC component, a low-order AC component and a high-order AC component at every block. Therefore, in this embodiment, the DC component, for example, is set to 0-order and the processing is carried out such that the numerical value is increased such as first-order and second-order as the frequency of the AC component is increased.

In step 310, data having a low-degree is added with an error correction code having a large bit number. The reason for this is that, when an image is reproduced, the DC component and the low-order AC component (AC component having a low frequency component) are more influential from a visual sense standpoint, or error becomes conspicuous.

As described above, even when the coding based on the discrete cosine transform is carried out, the error correction codes having smaller bit numbers are added to data as the frequencies are increased, such as the DC component, the low-order AC component and the high-order AC component. Therefore, similarly to the case that the coding is carried out by the ADRC processing, the transmission information amount can be reduced. Also, even when an error occurs in the data, it is possible to considerably reduce a deterioration of picture quality of a restored image.

While the error correction codes are added to all data while the bit numbers from 0-degree to high-degree are changed, the present invention is not limited thereto and such a variant is also possible. That is to say, error correction codes having large bit numbers may be added to only data of component that can be easily discriminated from a visual sense standpoint, such as 0-degree DC component, first-degree DC component, second-degree DC component or the like and the error correction code may not be added to high-degree component data that is not affected substantially from a visual sense standpoint. Alternatively, an error correction code having a very small bit number may be added to such high-degree component data. Also in such case, the transmission information amount can be reduced sufficiently. Even if an error occurs, then the deterioration of picture quality of a restored image can be reduced.

A circuit including an error correction apparatus in which data processed by the circuit shown in FIG. 2 is reproduced and restored or received and restored, i.e., a decoder will be described with reference to FIG. 6.

As shown in FIG. 6, reproduced data from a VTR reproducing system (not shown) is supplied to an input terminal 9. This data from the input terminal 9 is analyzed by a frame analyzing circuit 10 into block data (coded code), minimum value data and dynamic range data. Also, after the frame analyzing circuit 10 effects the error correction processing on these data, the frame analyzing circuit 10 supplies the block data to a decoding circuit 12, supplies the dynamic range data to a bit length determining circuit 11 and supplies the minimum value data to an adding circuit 13.

The error correction is carried out as follows. More specifically, when only data corresponding to the MSB data is extracted on the encoder side and added with the error correction code, the frame analyzing circuit 10 error-corrects only the data corresponding to the MSB data on the basis of information indicative of the above-mentioned situation.

When error correction codes having smaller bit numbers are sequentially added to data from the data corresponding to the MSB data to the data corresponding to the LSB data, the frame analyzing circuit 10 error-corrects data from the data corresponding to the MSB data to the data corresponding to the LSB data on the basis of error correction codes added to the MSB to LSB by information indicative of such situation.

The bit length determining circuit 11 determines the bit length at every block from the dynamic range data similarly to the encoder and supplies the decoding circuit 12 with bit length data.

The adding circuit 13 adds the data from the decoding circuit 12 and the minimum value data from the frame analyzing circuit 10 to thereby decode original pixel data. An output of the adding circuit 13 is supplied to a block analyzing circuit 14.

The block analyzing circuit 14 converts decoded data of the block order into data of order similar to the scanning of a television signal. The block analyzing circuit 14 supplies data thus converted through an output terminal 15 to the VTR reproducing system (not shown).

When data coded by the discrete cosine transform on the encoder side is added with the error correction codes having smaller bit numbers from the level data of the DC component to the high-degree AC component, the error correction is carried out on the basis of the respective added error correction codes, though not shown.

Further, of the data coded by the discrete cosine transform, when error correction codes are added to only the level data of the component that is influential from a visual sense standpoint, such as a DC component or the like particularly in the presence of error, only the data added with the error correction code is corrected in error, though not shown.

As described above, according to this embodiment, when the error correction code is added to data encoded in an ADRC fashion, the error correction codes having small bit numbers are sequentially added to data from the data corresponding to the MSB data which are influential from a visual sense standpoint to the data corresponding to the LSB data or the error correction codes are added to only the data corresponding to the MSB data and the data thus processed are corrected in error to thereby restore such data as image data. Therefore, the transmission information amount can be reduced. Even when an error occurs, the deterioration of the picture quality can be suppressed to the minimum.

Furthermore, when the error correction code is added to data encoded in a discrete cosine transform fashion, the error correction codes having small bit numbers are sequentially added to level data of the DC component which is influential from a visual sense standpoint to the level data of the high-degree AC component or the error correction codes are added to only the level data which is relatively influential from a visual sense standpoint such as level data of DC component or the like and the data thus processed are corrected in error to thereby restore such data as image data. Therefore, the transmission information amount can be reduced. Even when an error occurs, the deterioration of the picture quality can be suppressed to the minimum.

While the present invention is applied to the VTR as described above, the present invention is not limited thereto and can be applied to a data transmission system such as a teleconference system or the like with similar effects being achieved.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A coding apparatus for coding digital data comprising:
   encode means for encoding digital data, said encode means including means for dividing said digital data into a plurality of blocks, means for detecting a maximum value and a minimum value of a plurality of data within each block, means for calculating a difference between said detected maximum or minimum value of each block and data of each of said blocks, means for determining a quantization bit number on the basis of said maximum or minimum value of each of said blocks, and quantizing means for quantizing said difference by said determined quantization bit number and outputting quantized data as coded data; and error correction code adding means for adding a plurality of error correction codes of different bit numbers to a plurality of corresponding portions of said encoded digital data, wherein the bit number of the error correction code added to bits of more significance (MSB side) of said encoded digital data is larger than the bit number of the error correction code added to bits of lesser significance (LSB side) of said encoded digital data.

2. A coding apparatus for coding digital data according to claim 1, wherein said error correction code adding means adds different error correction codes to said digital data in response to a frequency of said encoded digital data.

3. A coding apparatus for coding digital data according to claim 2, wherein said error correction code adding means adds an error correction code having a bit number larger than an error correction code added to data having a higher frequency to data having a low frequency of said encoded digital data.

4. A coding apparatus for coding digital data according to claim 1, wherein the bit number of error correction code added to each of said data becomes sequentially smaller from the data of MSB side to the data of LSB side.

5. A coding apparatus for coding digital data according to claim 1, wherein said error correction code adding means adds an error correction code only to the data of MSB side of said encoded data.

6. A coding apparatus for coding digital data according to claim 1, wherein said encode means encodes digital data by using an ADRC (adaptive dynamic range coding) method.

7. A coding apparatus for coding digital data according to claim 1, wherein said encode means encodes said digital data by a discrete cosine transform.

8. A transmitting apparatus comprising:

encode means for encoding digital data, said encode means including means for dividing said digital data into a plurality of blocks, means for detecting a maximum value and a minimum value of a plurality of data within each block, means for calculating a difference between said detected maximum or minimum value of each block and data of each of said blocks, means for determining a..quantization bit number on the basis of said maximum or minimum value of each of said blocks, and quantizing means for quantizing said difference by said determined quantization bit number and outputting quantized data as coded data;

error correction code adding means for adding a plurality of error correction codes of different bit numbers to a plurality of corresponding portions of said encoded digital data, wherein the bit number of the error correction code added to bits of more significance (MSB side) of said encoded digital data is larger than the bit number of the error correction code added to bits of lesser significance (LSB side) of said encoded digital data;

means for transmitting encoded data with said added error correction codes;

means for receiving said transmitted data;

means for error-correcting said received data by using an error correction code contained in said received data; and means for decoding said error-corrected data.

9. A coding method for coding digital data, comprising the steps of:

encoding digital data by dividing said digital data into a plurality of blocks, detecting a maximum value and a minimum value of a plurality of data within each block, calculating a difference between said detected maximum or minimum value of each block and data of each of said blocks, determining a quantization bit number on the basis of said maximum or minimum value of each of said blocks, and quantizing said difference by said determined quantization bit number and outputting quantized data as code data; and adding a plurality of error correction codes of different bit numbers to a plurality of corresponding portions of said encoded digital data, wherein the bit number of the error correction code added to bits of more significance (MSB side) of said encoded digital data is larger than the bit number of the error correction code added to bits of lesser significance (LSB side) of said encoded digital data.

10. A coding method for coding digital data according to claim 9, wherein said error correction adding step includes the step of sequentially deriving MSB to LSB of said encoded data and the step of adding error correction codes of different bit numbers to said derived data.

11. A coding method for coding digital data according to claim 10, wherein said error correction code added to data of MSB side has a bit number larger than that of the error correction code added to data of LSB side.

* * * * *